United States Patent

[11] 3,570,373

[72] Inventor Willem E. Tupker
 Sepulveda, Calif.
[21] Appl. No. 819,231
[22] Filed Apr. 25, 1969
[45] Patented Mar. 16, 1971
[73] Assignee Bell Aerospace Corporation

[54] VALVE OPERATOR AND METHOD OF MAKING THE SAME
 8 Claims, 2 Drawing Figs.

[52] U.S. Cl. .................................................. 92/138,
 251/58
[51] Int. Cl. ...................................................... F01b 9/00
[50] Field of Search .......................................... 92/138;
 308/245; 251/58, 62, 89, 99, 104

[56] References Cited
UNITED STATES PATENTS

| | | | |
|---|---|---|---|
| 147,103 | 2/1874 | Cathcart ...................... | 308/245 |
| 486,175 | 11/1892 | Angell ........................ | 308/245X |
| 3,152,520 | 10/1964 | Heese ........................ | 92/138X |
| 3,182,567 | 5/1965 | Shenk ........................ | 92/138 |
| 3,385,120 | 5/1968 | Nott .......................... | 74/104X |

*Primary Examiner*—Edgar W. Geoghegan
*Assistant Examiner*—Allen M. Ostrager
*Attorney*—Nilsson & Robbins

ABSTRACT: The valve operator disclosed includes a housing constructed of substantially identical housing halves joined together at mating surfaces. Cylinder means is secured to the housing and bridges the housing halves.

INVENTOR
WILLEM E. TUPKER

BY Nilsson + Robbins
ATTORNEYS

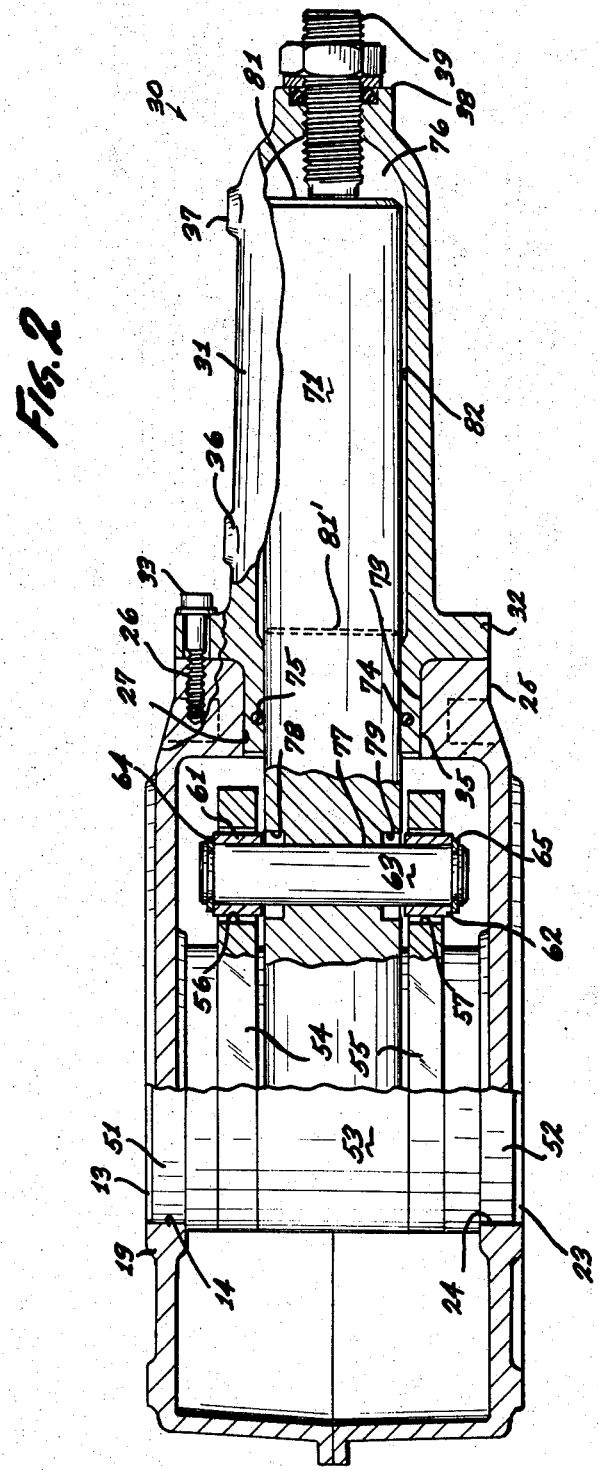

VALVE OPERATOR AND METHOD OF MAKING THE SAME

BACKGROUND OF THE INVENTION

1. Field of the Invention

The field of art to which the invention relates is fluid-handling apparatus and particularly to devices for nonmanual operation of valves used with such apparatus.

2. Prior Art Problems

Valve operators designed for nonmanually positioning rotary plug-type valves which during operation usually rotate approximately 90° have been known for some time in the prior art. For example, reference is made to U.S. Pat. Nos. 3,056,573; 3,104,592; 3,204,920; and 3,261,266.

As will be seen by reference to the foregoing patents such valve operators may be utilized to position valves of all sizes ranging from quite small to extremely large and involving tremendous pressures and forces in each instance. However, it should be apparent that the valve operators as disclosed are relatively complex in structure and require large amounts of handwork to manufacture the same. Such hand operations increase weight, cause noninterchangeability of parts, and in some instances affect reliability of the valve operator.

SUMMARY OF THE INVENTION

A valve operator in accordance with the present invention includes two substantially identical housing halves which are joined together along mating surfaces. Lever means which is adapted for engagement with a valve stem to rotate the same is received within bearing means defined by each of the housing halves. A plunger is slidably disposed within a cylinder means which is detachably secured to the housing halves and to which fluid under pressure is applied to separately move the same. The lever and the plunger are interconnected and operate so as to position the valve as desired.

BRIEF DESCRIPTION OF THE DRAWINGS

FIG. 2 is a cross-sectional view of a valve operator constructed in accordance with the present invention, fully assembled, taken about the lines 2-2 of FIG. 1.

DESCRIPTION OF THE INVENTION

Figure 1:
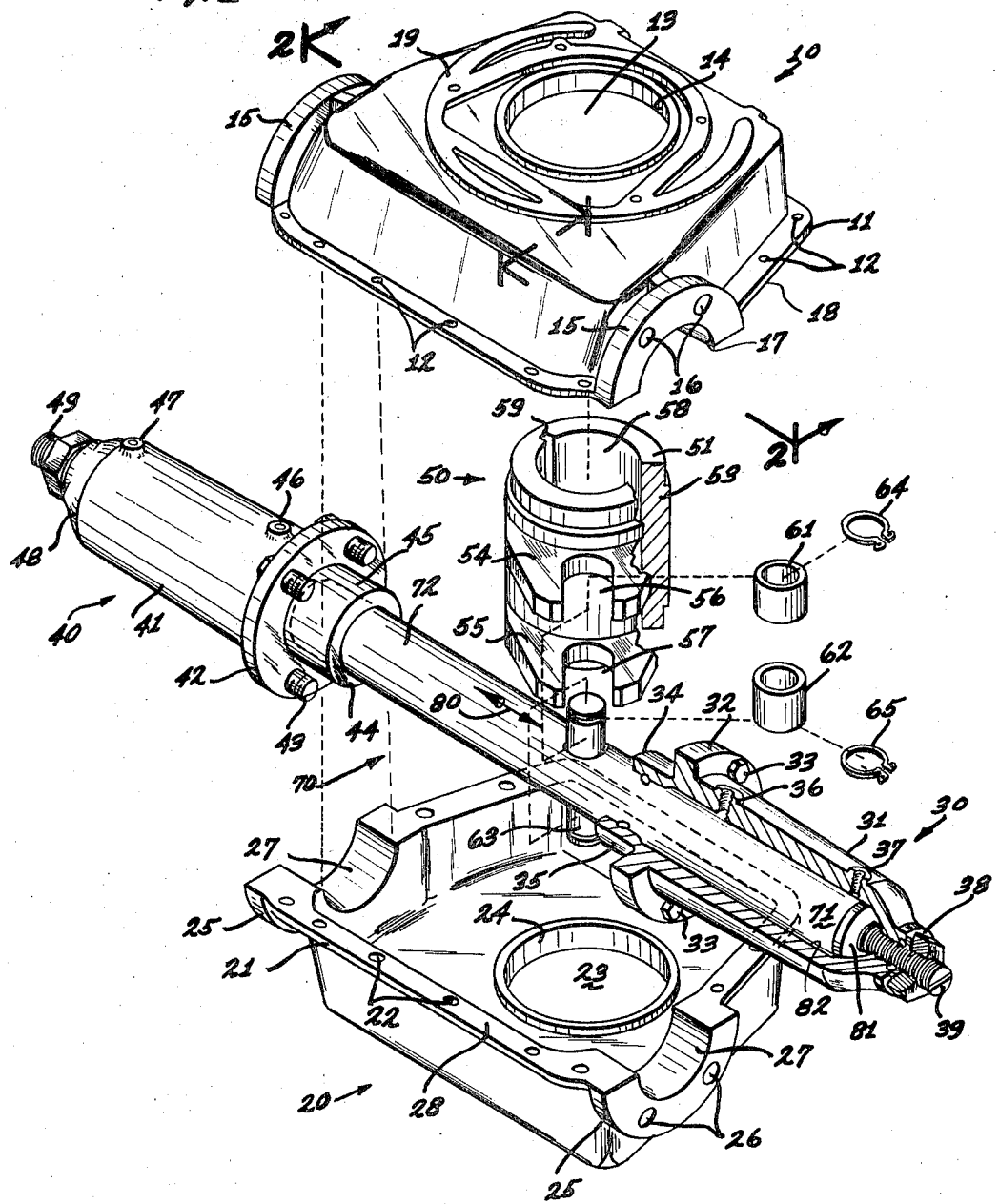
FIG. 1 illustrates in exploded form a valve operator constructed in accordance with the present invention.

Referring now to the drawings, there is illustrated first and second housing halves 10, 20, respectively. As is shown, each of the housing halves 10, 20, is formed of a cast half-shell metallic member which, when brought together to form the fully assembled housing defines a cavity within which is placed the various operating portions of the valve operator.

The first housing half 10 includes an outwardly extending peripheral flange 11 which defines a plurality of openings 12 therein which are adapted to receive bolts which are utilized to securely join the housing halves 10, 20 together. The housing half 10 in the upper surface thereof defines an opening 13 which is adapted to receive one end 51 of a lever means 50. The opening 13 is defined by the bearing surface 14. Cylinder mounting flanges are provided on the completed housing when the two halves 10—20 are brought together and as shown in FIG. 1, the upper half 15 of such mounting flange is illustrated. Openings 16 are provided in the upper half 15 of the cylinder mounting flange to receive bolts or screws which are utilized to attach the cylinders 30 to the completed housing structure. The inner surface 17 provides the upper half of a bearing surface which receives a mating surface of the cylinder as will be more fully described below.

The second housing half 20 is substantially identical to the first housing half 10 in that each are cast from like molds and then have certain areas thereof machine finished, as will be described more fully below. This substantial identity is indicated by utilizing the same units digit to identify a part of the housing half 10 and 20 but preceded by a different tens digit to thereby indicate the first (10) or second (20) housing half.

In the manufacture of a housing for the valve operator in accordance with the present invention, each of the housing halves if first cast to provide a rough cast one-half shell-like member. Thereafter, each housing half is machine finished in predetermined areas. For example, the lever means bearing surfaces 14, 24 are machined to provide the desired tolerances and finishes. Upon the outer surface of the housing half 10 such, for example, as at 19, areas may be finished to receive mounting flanges of accessory equipment such as power packs, control equipment or alternatively for mounting of the apparatus upon a valve housing. In addition, the mating surfaces 18, 28 of the first and second housing halves are also finished to provide mating or joining surfaces when the two housing halves are brought together. After the finishing operations have been performed upon each of the housing halves individually, they are then mated, that is, brought together and aligned and then bolts or similar fastening devices are inserted through at least some of the openings in the flanges 11, 21, to maintain the first and second housing halves in aligned mated relationship. While in this position the exterior surfaces of the cylinder mounting flanges are finished and, in addition thereto, the inner bearing surfaces 17, 27 are also finished. In this way, continuous bearing surfaces are provided even though the apparatus is formed of two separately cast members. Thereafter, these two cast and machine-finished housing halves are kept together and form the completed housing for a valve operator.

A first cylinder 30 is formed of an integral cast member defining a hollow, cylindrical body 31 having a flange 32 extending radially outwardly therefrom. The flange 32 defines a plurality of openings therein adapted to receive mounting bolts 33 which are received within the openings 16, 26 above described. The mounting flange 32 is spaced from the end 34 of the hollow body 31, thereby to provide an extension 35 which is received within the opening defined by the bearing surfaces 17, 27 of the housing halves 10, 20. Bosses 36 and 37 may be drilled and tapped as shown in FIGURE 1 to provide means for attaching hydraulic fluid pressure fittings or to provide bleed ports as the case may be. The opposite end 38 of the hollow cylinder 31 defines a bore which may be threaded to receive an adjusting screw 39 which is utilized to limit the stroke of the plunger as is well known in the prior art. A second cylinder 40 is also provided and is identical to the first cylinder 30 and such is indicated by utilizing the same units digit when referring to the same or common parts thereof but by utilizing the tens digit 4 instead of the tens digit 3 as was done in the above discussion.

An integrally cast lever means 50 is provided and is adapted to be positioned within the cavity defined by the housing halves 10, 20 when joined together. Upper and lower hub bearings 51 and 52 are journaled in the bearing surfaces 14, 24 of the first and second housing halves respectively. The hub 53 has upper and lower lever arms 54 and 55 respectively extending therefrom. The lever arms 54 and 55 are relieved or slotted as shown at 56 and 57, respectively, to provide a scotch yoke adapted to receive force transfer means in the form of rollers 61 and 62, respectively, which are mounted on opposite ends of roller pin 63 and held in place thereon by retaining rings 64 and 65 respectively. The hub 53 is hollow and has an inner surface 58 which defines a keyway 59 adapted to receive a key formed upon the stem of the valve upon which the valve operator is positioned.

A plunger 70 is formed of constant diameter end sections 71 and 72 which are received within the cylinder bodies 31, 41. The inner surfaces 73 of the portion 35 of the cylinder 31 extending beyond the flange 32 are finished to provide a smooth fitting bearing surface for the plunger 70. A dynamic seal such as an O-ring 74 is fitted within a slot 75 provided therefor so as to effect a dynamic seal to maintain the hydraulic fluid under pressure within the space 76 provided in the hollow cylindrical body 31 therefor. A bore 77 is provided approximately centrally of the plunger 70 to receive the roller pin 63.

In assembly of the valve actuator in accordance with the present invention, a worker would first preassemble the various parts of the operator and thereafter bring the housing halves together. In such an operation the roller pin 63 would first be inserted through the plunger 70 and the rollers affixed in place by the snap rings 64 and 65. The O-ring would be placed in the slot 75 and the plunger 70 inserted with its two ends 71 and 72 in the respective cylinders provided therefor. The lever means 50 can then be positioned so that the rollers 61 and 62 are properly positioned within the slots 56 and 57 provided therefor. This subassembly would then be positioned so that the hub bearing 52 is positioned within the opening 23 provided therefor. Thereafter, the first housing half 10 would be positioned so that the hub bearing 51 is received within the opening 13. Thereafter, bolts would be positioned within the openings 12, 22 provided therefor and the entire structure brought into proper position. Subsequent thereto the bolts 33 would be positioned through the mounting flanges 32, 42 and into the openings 16, 26 provided in the first and second housing halves therefor. It should be noted that the mounting flanges 32, 42 bridge the first and second housing halves 10, 20, thereby providing additional structural integrity for the completed housing. Additional peripheral equipment (not shown would then be attached as desired.

Once the completed valve operator is mounted upon a valve housing, hydraulic fluid under pressure is applied to the first or second cylinders 30, 40 respectively, to move the plunger in the desired direction as indicated by the arrow 80 to open or close the valve as desired. For example, referring to FIG. 2, hydraulic fluid under pressure may be inserted through the opening provided in the boss 36 so as to apply a force against the end 81 of the plunger end 71. This force causes the plunger 70 to move toward the left as viewed in FIG. 2 and this linear force is translated to a rotary force by way of the rollers pushing against the levers, thus turning the hub 53 and ultimately the valve stem and valve in a clockwise direction. When the plunger has moved through its complete travel, its end 81 would be in the position illustrated in dashed lines 81' of FIG. 2. It would be obvious to those skilled in the art that by application of fluid pressure to the cylinder 41 the plunger 70 would be caused to move toward the right as shown in FIG. 2 thus moving the lever means 50 in a counterclockwise direction.

A feature of significance in the valve operator of the present invention is that by utilizing a plunger 70 having end portions of constant diameter, that diameter conforming to the inner diameter of the surface 73, no pistons are utilized. This structure precludes the necessity of the polished finishing of the interior surfaces 82 (FIG. 2) of the cylinder bodies 31 and 41 as is normally required. It should also be noted that by having a large integral bearing provided by the bearing surface 73, the loads normally associated with the plunger as a result of the hub, yoke combination of the lever means is readily absorbed without the usual canting or cocking associated with valve operators of this type.

There has thus been described a valve operator illustrated in one specific embodiment, parts of which may vary without departing from the scope of the claims.

I claim:
1. A valve operator comprising:
 a. first and second substantially identical housing halves detachably joined along centrally disposed flanges defining mating surfaces, said identical halves, when joined, defining a cavity, and each of said housing halves defining bearing means;
 b. cylinder means detachably secured to each of said housing halves and extending outwardly therefrom;
 c. lever means disposed in said cavity for engagement with a valve, said lever means being rotatably received in said bearing means; and
 d. plunger means slidably disposed in said cylinder means for reciprocal movement therein and including a portion disposed in said cavity and having force transfer means affixed thereto for engaging said lever means.

2. A valve operator as defined in claim 1 in which said lever means is a unitary cast member having a hub and a yoke and said yoke is a scotch yoke.

3. A valve operator as defined in claim 1 in which said cylinder means includes first and second cylinders, axially aligned, and secured to said housing halves on opposite sides thereof, each of said cylinders being secured to each of said first and second housing halves.

4. A valve operator as defined in claim 3 in which said plunger means is a constant diameter continuous member except for said force transfer means which is a pin extending through said plunger with at least one roller mounted thereon.

5. A valve operator as defined in claim 3 in which said first and second cylinders are unitary cast members and each defines a bore in one end for receiving said plunger means and a mounting flange displaced from said one end, and said first and second housing halves further define, when joined, first and second opposed openings for receiving that portion of said first and second cylinders, respectively, extending between said flange and said one end.

6. A valve operator as defined in claim 5 wherein said bore-defining surface on each of said cylinders defines an integral bearing surface for said plunger means.

7. The method of manufacturing a valve operator housing comprising the steps of:
 casting first and second identical halves of said housing;
 finishing first predetermined areas of each of said halves individually;
 joining said halves together; and
 finishing second predetermined areas of each of said halves thereby to provide contiguous mating surfaces on opposed noncontacting portions of said halves.

8. The method as defined in claim 7 which further includes the steps of opening said finished housing halves; preassembling internal operating parts of said operator; positioning said preassembled parts in one of said housing halves; and seating the other of said housing halves to enclose said preassembled parts.